(12) United States Patent
Myklebust et al.

(10) Patent No.: US 11,817,008 B2
(45) Date of Patent: Nov. 14, 2023

(54) CPR TRAINING SYSTEM AND METHOD FOR COMMUNICATION DURING CPR TRAINING

(71) Applicant: LAERDAL MEDICAL AS, Stavanger (NO)

(72) Inventors: Helge Myklebust, Stavanger (NO); Tonje Søraas Birkenes, Stavanger (NO); Sigurd Bårdsen, Randaberg (NO); Per Helge Aasland, Stavanger (NO); Hege Torsvik, Stavanger (NO); Daniel Vartdal, Stavanger (NO); Solveig Haukås Haaland, Kvernaland (NO)

(73) Assignee: LAERDAL MEDICAL AS, Stavanger (NO)

( * ) Notice: Subject to any disclaimer, the term of this patent is extended or adjusted under 35 U.S.C. 154(b) by 677 days.

(21) Appl. No.: 16/480,124

(22) PCT Filed: Jan. 24, 2018

(86) PCT No.: PCT/EP2018/051720
§ 371 (c)(1),
(2) Date: Jul. 23, 2019

(87) PCT Pub. No.: WO2018/138143
PCT Pub. Date: Aug. 2, 2018

(65) Prior Publication Data
US 2019/0385486 A1    Dec. 19, 2019

(30) Foreign Application Priority Data
Jan. 24, 2017  (NO) .................................. 20170103

(51) Int. Cl.
| | | |
|---|---|---|
| G09B 23/28 | (2006.01) | |
| A61H 31/00 | (2006.01) | |
| G09B 5/02 | (2006.01) | |

(52) U.S. Cl.
CPC ......... G09B 23/288 (2013.01); A61H 31/005 (2013.01); G09B 5/02 (2013.01)

(58) Field of Classification Search
CPC ........................... G09B 23/288; A61H 31/005
See application file for complete search history.

(56) References Cited

U.S. PATENT DOCUMENTS 8,734,161 B1 * 5/2014 Centen ................. G09B 23/288
434/262
9,429,453 B1 * 8/2016 O'Keeffe ................... G01F 1/68
(Continued)

FOREIGN PATENT DOCUMENTS

| CA | 2984108 A1 | 12/2016 |
| CN | 101630993 A | 1/2010 |

(Continued)

OTHER PUBLICATIONS

International Search Report issued in PCT/EP2018/051720 dated Mar. 13, 2018 (2 pages).
(Continued)

*Primary Examiner* — Peter R Egloff
(74) *Attorney, Agent, or Firm* — Osha Bergman Watanabe & Burton LLP

(57) ABSTRACT

A CPR training system comprises a plurality of CPR training manikins and at least one receiver unit, where each manikin comprises at least one sensor and a microcontroller connected to each sensor. The microcontroller is connected to a Bluetooth transmitter which is adapted to transmit the data from the sensors within a BLE advertising package to the at least one receiver unit. For the CPR training system there
(Continued)

may also be provided a multi CPR monitoring device which comprises the receiver unit, a user interface, and a processor, where the receiver unit is adapted to receive CPR data from the transmitters as BLE advertising packages, the processor analyzes the received data, and the user interface shows the result of the analysis in a grid, where each grid cell represents the data from a respective transmitter.

15 Claims, 4 Drawing Sheets

(56) References Cited

U.S. PATENT DOCUMENTS

| | | | |
|---|---|---|---|
| 2009/0215011 A1* | 8/2009 | Christensen | G09B 23/28 |
| | | | 434/29 |
| 2010/0291522 A1* | 11/2010 | Cook | G09B 23/30 |
| | | | 434/265 |
| 2012/0220887 A1 | 8/2012 | Fossan | |
| 2012/0288837 A1* | 11/2012 | Eikefjord | G09B 23/32 |
| | | | 434/262 |
| 2013/0094420 A1 | 4/2013 | Krueger et al. | |
| 2013/0165044 A1 | 6/2013 | Xie et al. | |
| 2014/0272869 A1* | 9/2014 | Hambelton | G09B 5/14 |
| | | | 434/265 |
| 2015/0312858 A1 | 10/2015 | Kerai | |
| 2016/0269577 A1 | 9/2016 | Sato | |
| 2017/0123043 A1 | 5/2017 | Marka et al. | |
| 2017/0294145 A1* | 10/2017 | Kwon | G01L 1/16 |

FOREIGN PATENT DOCUMENTS

| | | |
|---|---|---|
| CN | 103985234 A | 8/2014 |
| CN | 104103162 A | 10/2014 |
| CN | 105708458 A | 6/2016 |
| GB | 2 514 817 A | 12/2014 |
| JP | 2016170630 A | 9/2016 |
| KR | 10-2015-0066988 A | 6/2015 |
| KR | 10-2016-0092805 A | 8/2016 |
| NO | 20110055 A1 | 7/2012 |
| TW | I284466 B | 7/2007 |
| WO | 2012/047504 A1 | 4/2012 |
| WO | 2012066681 A1 | 5/2012 |
| WO | 2016001087 A1 | 1/2016 |

OTHER PUBLICATIONS

Written Opinion of the International Searching Authority issued in PCT/EP2018/051720 dated Mar. 13, 2018 (5 pages).
Norwegian Search Report issued in NO 20170103 dated Oct. 19, 2017 (2 pages).
Office Action issued in Chinese Application No. 201880005882.7 dated Nov. 19, 2021.
Office Action issued in Japanese Application No. 2019-538142 dated Nov. 17, 2021 (7 pages).
Search Report issued in counterpart Australian Patent Application No. 2018211376, dated Feb. 18, 2021 (5 pages).
Office Action in counterpart European Patent Application No. 18 702 451.8 dated Jun. 19, 2020 (6 pages).
Notice of Provisional Refusal issued in Korean Application No. 10-2019-7024626 dated Jul. 19, 2022 (10 pages).

* cited by examiner

CPR TRAINING SYSTEM AND METHOD FOR COMMUNICATION DURING CPR TRAINING

Millions of people train first aid and cardio-pulmonary resuscitation (CPR) every year. Most trainings are instructor led, and comprises a blend of cognitive learning and psychomotor skills training. To practice psychomotor skills, most classes use training manikins designed for chest compressions and rescue breaths. In some cases, these manikins are instrumented to measure how chest compressions are delivered, and how rescue breaths are delivered by the trainee.

Instrumented manikins can also have feedback devices, which gives the trainee and instructor objective information, to close performance gaps. These manikins are quite complex, heavy and expensive, and they are mostly shared among several students in a class. In a class, the instructor will be present to coach and support each individual. Since the students share a manikin, practice time is limited for each participant.

In order to get more practice time, some classes use one manikin per trainee. These manikins are normally smaller, lightweight and less expensive, and may include a sensor system to measure how chest compressions and/or ventilations are delivered. The challenge is how to use the information from these manikins for the benefit of learning. It may not be practical for the instructor to follow performance from each student in a class of 8-50 trainees by walking around and look. It would be more efficient for the instructor to see an overview of class performance on a monitor and thereby identify who among the trainees needs personal attention.

Technology exists today which can be used to communicate information from a plurality of sensors wirelessly to a receiver. One example of wireless communication is WiFi, which for example is used in Laerdal QCPR manikin with SkillPad. Up to six manikins can be connected simultaneously, when a wifi router is used. It is also possible to use Bluetooth, as in Resusci Anne Wireless Skillreporter, which allows up to six manikins to connect to a PC. However, this technology is limited to a small number of manikins, and require setup with two-way communication between manikin and receiver. It also prevents more than one feedback device to see the CPR performance. When used, connection is always active although CPR may not be performed, which in turn drain unnecessary power from the batteries.

Another example of related technology can be found in TWI284466, which describes a bluetooth networks system for education. The system comprises a host device, at least one teaching terminal for students and a Bluetooth transmission module. The system is not for CPR training and has the same limitations as set out above.

CN20141736977 describes a monitoring system for chest compressions performed on a patient. Impedance data for chest compressions are monitored, processed and transferred wireless to a mobile terminal if the processed data meets certain criteria.

NO20110055 describes a monitoring system for monitoring CPR performance performed on a patient. The system has a reference unit and a receiving unit. Measurements signals are transferred wirelessly from the reference unit to the receiver where the signals are analyzed.

WO2012047504 describes a system for training CPR, comprising a number of training mannequins, each comprising at least a sensor and a microcontroller connected to the sensor and a radio link, for example Wifi, or a physical connection. This system has the same disadvantages as the systems described above, such as the need for being continuously active and limiting the number of possible users.

As described above, the Laerdal WPR Training system may use Bluetooth communication. For this, it has been developed an affordable and simple CPR sensor, which uses BLE (blue tooth low energy) to communicate CPR performance data to a receiver. When connected to a receiver, like smart-phone or tablet, CPR data from several manikins can be communicated. As in the systems above, each sensor must be paired or connected with the receiver in order to send data, only one feedback device can be used, and power is drained from the battery as long as connection is active.

There is thus a need for an efficient, simple and affordable method of communicating CPR performance from a plurality of manikin sensors wirelessly to a receiver that is accessible by the instructor.

The object of the invention is to provide a system and method that meet this need.

The object of the invention is achieved by means of the features of the patent claims.

In one embodiment, a CPR training system comprises a plurality of CPR training manikins and at least one receiver unit. Each manikin comprises at least one sensor and a microcontroller connected to each sensor. The microcontroller is connected to a Bluetooth transmitter, for example a Bluetooth Low Energy (BLE) transmitter, adapted to transmit the data from the sensors within a BLE advertising package to the at least one receiver unit.

The CPR training manikins may be any suitable training manikin, for example Laerdal Medical's Resusci Anne®. The sensors may be any kind of sensor suitable for measuring a characteristic of chest compressions and/or ventilations. For example, may the sensor be a movement sensor, a force sensor measuring the downward force of the compressions, an acceleration sensor, tilt sensor, compression depth sensor, compression rate sensor, ventilation volume sensor, chest rise sensor, etc.

The microcontroller is a control unit that can receive the data from the sensors, process the data and transfer the processed data to the Bluetooth transmitter for transmitting to the receiver. The data from the sensors are processed to provide relevant information related to the CPR procedure such as instantaneous or average compression depth, compression rate, compression force, ventilation rate, ventilation volume, inadequate release of compressions, a combined CPR score, etc.

There may be one microcontroller for each sensor, ie. each sensor having a dedicated, separate microcontroller connected to it. Alternatively, one microcontroller may be connected to several sensors, for example each training manikin comprising one microcontroller connected to each of the several sensors of its training manikin.

In one embodiment, the microcontroller is adapted to use information from the sensors to detect when a compression starts and to transfer measurement data to the Bluetooth transmitter by start of compressions. This may for example be done by monitoring only one of the sensors, the detection of a change in signals from that sensor indicating start of a compression and thus that CPR training is starting. The microcontroller can be adapted to only activate BLE communication when sensor signals indicate that CPR training is ongoing, for example when a pre-defined number of compressions have been performed, or at start of the first compression. The system may thus be idle or in low power modus when no compressions are performed on any of the manikins, and each of the manikins (with sensor, microcontroller and Bluetooth transmitter) may have an active and a passive state. In the active state all sensors are active, the microcontroller is processing data for all sensors, and the processed data are transmitted to the receiver, while in the passive state only presence of compressions is detected and processed, ie. the passive state being a low-power state. In one embodiment, when a compression is detected, the active state is initiated and the controller starts monitoring all sensors, calculating the CPR data and transmitting the CPR data through the Bluetooth transmitter.

The system comprises a power source, for example a battery, or a connection to mains current. The low power/inactive states described above, ensures that the lifetime of the battery is as long as possible.

Bluetooth advertising generally is a broadcast function/protocol. The average range of Bluetooth advertising in class 2 is 15 meters to 40 meters for most Bluetooth enabled mobile devices. As with all wireless transmission, the range and accessibility to most Bluetooth advertising depends on the transmitter power class and the individual portage of the receiver equipment.

A BLE advertising package may comprise data characterizing at least one of: a) number of compressions, b) number of deep compressions, c) number of compressions with leaning (leaning is lack of release by the hand from the chest between each compression) d) average compression rate since start of compressions, e) average depth of compressions since start of compressions, f) time period with no ventilation, g) scoring parameters (for example Laerdal QCPR scoring)

The present invention provides a method and system to simplify connection between manikin sensors and receiver, reduce overall power consumption and increase the number of manikins that can communicate with a single receiver.

In one embodiment, the Bluetooth transmitter is adapted to transmit advertising packages in the time period from start of compressions until 30 seconds after last registered compression in a compression series.

The data transmitted to the receiver are for example used in a multi CPR monitoring device, which comprises a receiver unit, a user interface, and a processor. The receiver unit is adapted to receive CPR data from a plurality of transmitters as described above, where the data are transmitted in BLE advertising packages. The processor is adapted to analyze the received data, and the user interface is adapted to show the result of the analysis in a grid, where each grid cell represents the data from a respective transmitter.

In one embodiment, the processor is adapted to compare the values of the received CPR data with respective reference ranges, and if the values from any transmitter deviate from the respective reference range, provide an indication of the deviation in the grid cell of the user interface corresponding to that transmitter. In other embodiments, other kind of information may be displayed/indicated in the grid cell, for example the actual value of one or more CPR indicators. Any combinations of the above is also possible.

The indication of the deviation may for example be that each grid cell displays status information as a colored light, a number, a symbol, or other suitable indication.

In the case of more than one value from a transmitter deviating from the respective reference ranges, the processor can be adapted for displaying a sequence of indications of the deviations. For example, if a student compresses the chest of the manikin both too shallow and with incorrect frequency, two indications may be displayed alternatively on the user interface in order to make the teacher/instructor aware that the student needs attention and instructions on both elements.

The sequence of indications may be displayed in any order, but is in one embodiment displayed in prioritized order according to a pre-defined prioritizing list, for example based on the education level of the student group or other relevant information. In another embodiment, the processor is adapted to choose which deviation to display in the respective grid cell.

In one embodiment, the operation of a system as described above is done by measuring compression data with the at least one sensor, processing the compression data in the microcontroller, and transmitting the data from the sensors within a BLE advertising package to the at least one receiver unit.

As earlier described, information from the sensors is used to detect when a compression starts and also register continued compressions, and to initiate transfer of measurement data by means of the Bluetooth transmitter by start of compressions and until 30 seconds after last registered compression in the compression series.

The invention will now be described in more detail by means of examples and with reference to the accompanying figures.

Figure 1:
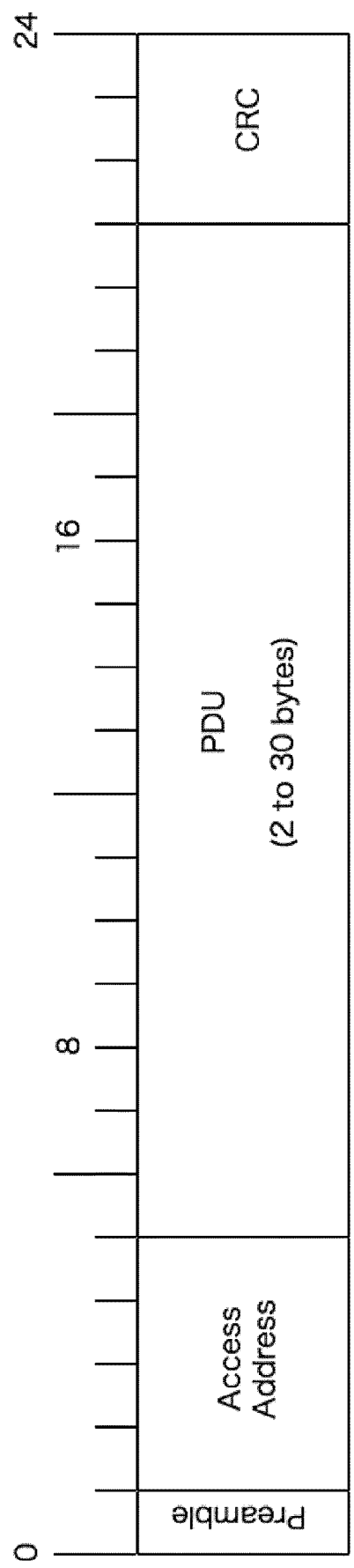
FIG. 1 shows a general Bluetooth Low Energy packet.

As shown in FIG. 1, generally, a Bluetooth Low Energy packet has the following components:

Preamble: used for internal protocol management. Advertising packets have 10101010b as the preamble.

Access Address: This is always 0x8E89BED6 (10001110100010011011111011010110b) for advertising packets.

PDU (protocol data unit): There are two PDU formats, one for advertising packets and one for data packets.

CRC (cyclic redundancy check): 3 byte value calculated over PDU.

Figure 2:
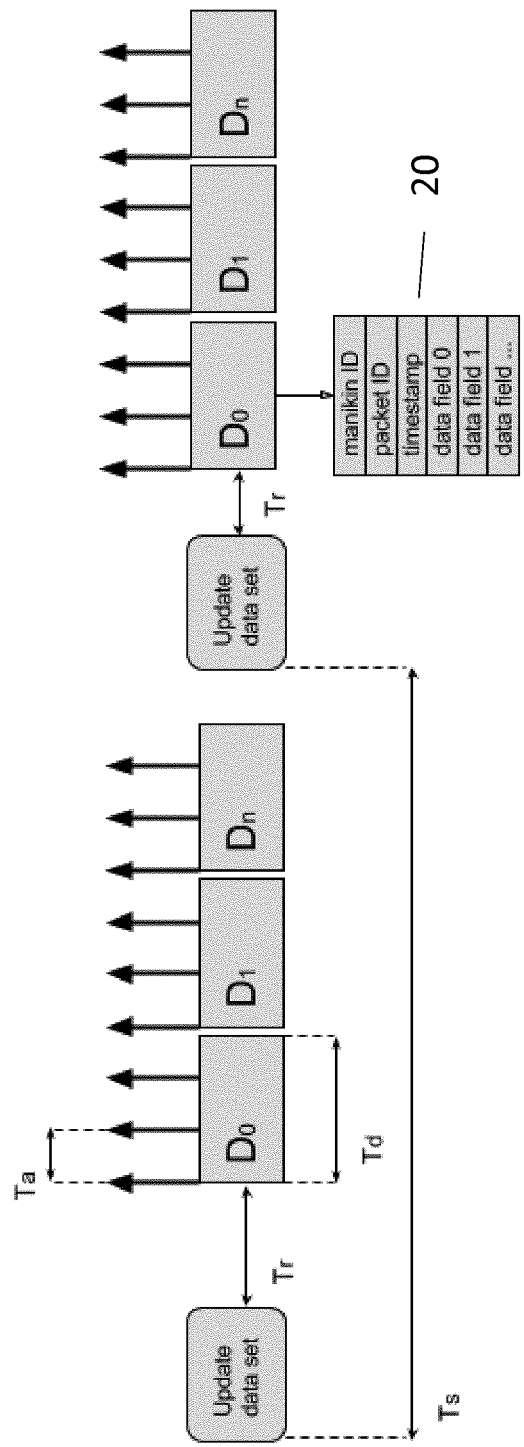
FIG. 2 shows an overview of the data processing (by the microcontroller) and communication (by the BLE) of an embodiment of the invention.

An overview of the communication process (when the system is active) is shown in FIG. 2.

Because the amount of data required to be sent from a manikin may exceed the size of a BLE advertisement packet, the dataset is divided into data packets ($D_0$ to $D_n$), which each match the size of BLE advertisement packets.

The dataset is sampled with a period of $T_s$. After a random delay of $T_r$, the first data packet is sent repeatedly for a duration of $T_d$. Redundancy is required because the communication protocol (one-way communication) is inherently unreliable. Furthermore, all data packets are sent on all three of the available BLE advertising channels to increase the chance of successful reception. The number of times each data packet is sent (on each advertising channel) depends on the advertisement interval $T_a$ and the duration $T_d$, ie. the number of times each data packet is sent is the largest integer less than or equal to (Td/Ta).

$T_d$ and $T_a$ are constant for all data packets, while $T_r$ is variable. Note that the random delay $T_r$ is added before the start of each dataset, which may reduce the number of manikins transmitting data at the same time, thus reducing the overall concurrent traffic (in the BLE frequency range)

generated by the manikins. Also, note that if $(n*T_d)+T_r>T_s$, the dataset will not be sampled until the next Ts interval.

The general structure and content of a data packet 20 is illustrated below $D_0$ of the second dataset in FIG. 2. Each data packet comprises a manikin ID, a packet ID and a timestamp. The rest of the data packet consists of data fields, which comprises information related to anything from CPR data to system status information. The manikin ID is used by the receiver unit to identify the manikin transmitting the information. The data packet ID is used by the receiver to determine what data is contained in the data fields. Note that all data packets in a specific dataset have the same timestamp to enable the receiver to distinguish redundant data.

During operation, the receiver unit (for example a phone or tablet with an app) is looking for devices with Bluetooth Low Energy that has the correct manufacturer and device information, and an appropriate manikin name. The receiver will use the manikin ID to determine what dataset to update, and what part of the user interface to update.

If several manikins have the same name, the Received Signal Strength Indication (RSSI) can be used to show information from the closest manikin. This will avoid confusion if two CPR classes are held in adjacent rooms or otherwise nearby. The packet ID will be used to determine how the user interface should be updated, and what data values in the data set to update.

Because duplicate data sets are sent continuously, the timestamp is used as identification to avoid processing and storing duplicate data by the receiver.

Figure 3:
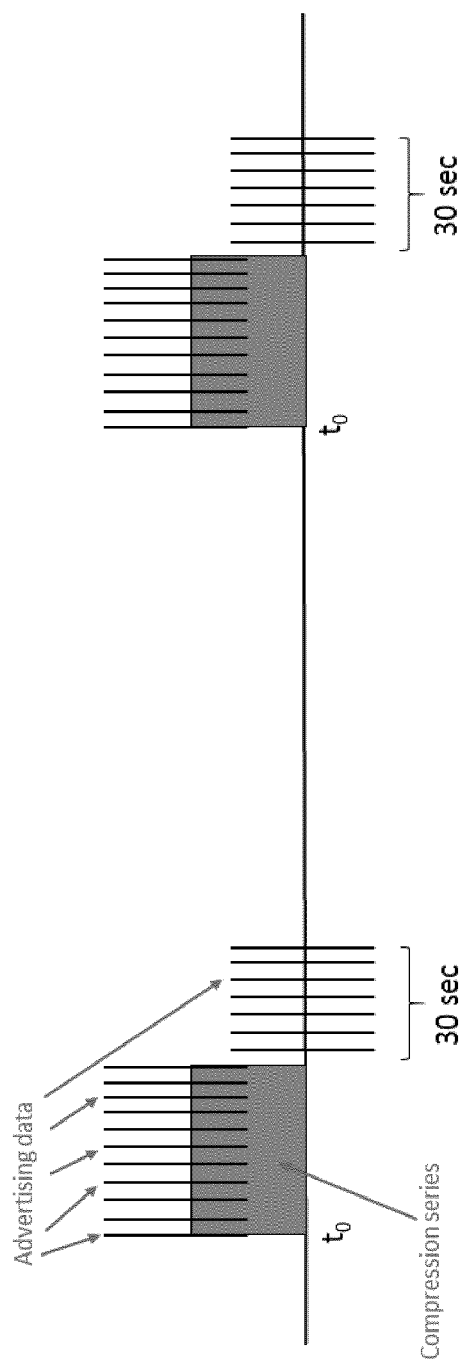
FIG. 3 illustrates the data packages transmitted from manikin sensors to the receiver.

FIG. 3 illustrates transmittance of advertising data in the time period from start of the 1st compression until 30 seconds after last registered compression in the compression series. A number n of data packets are transmitted, as described in FIG. 2, as long as compressions are carried out and 30 seconds after detection of the last compression.

Figure 4:
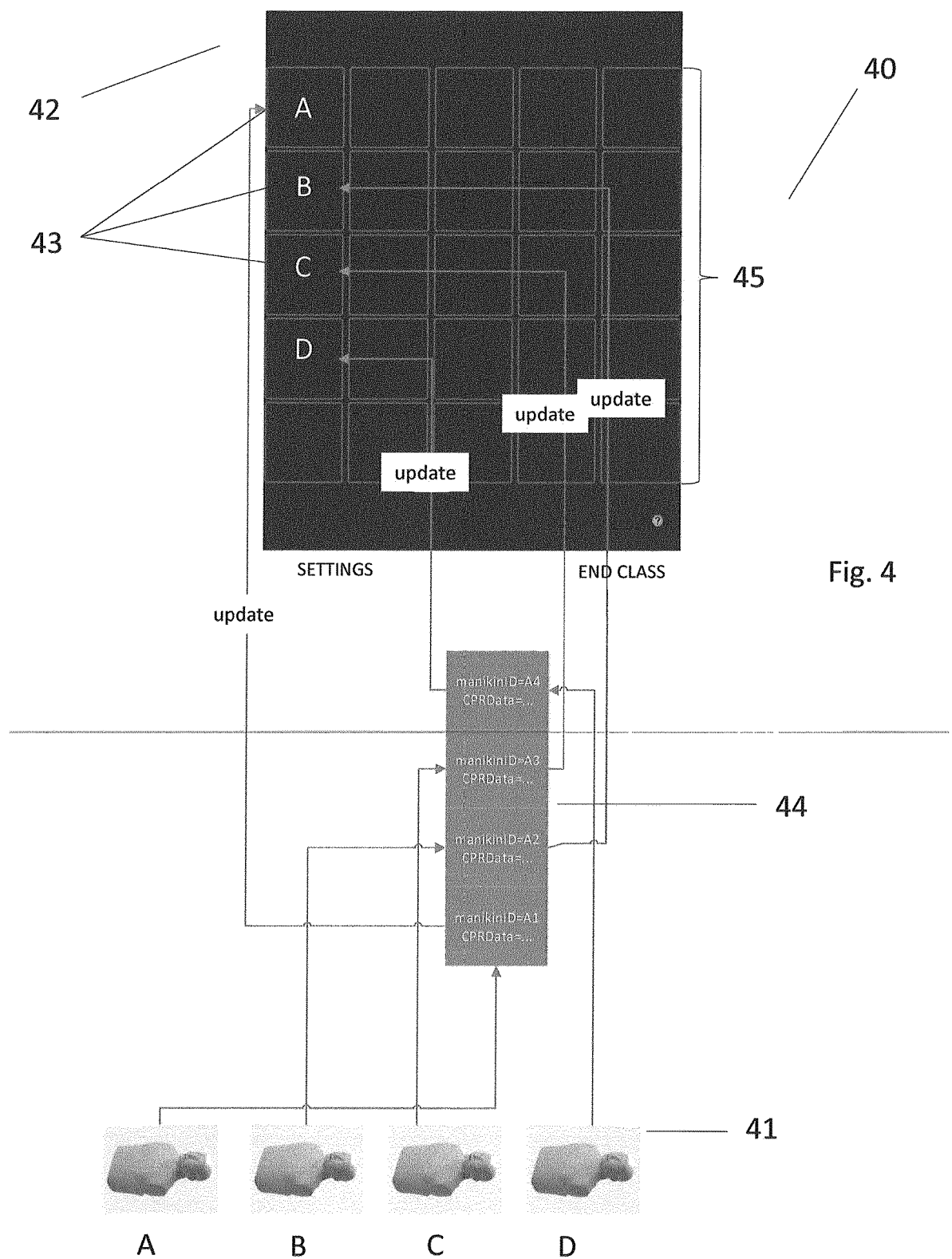
FIG. 4 shows an example of a user interface for displaying the information from each of the CPR manikins.

FIG. 4 illustrates an example of the CPR training system 40 comprising a plurality of CPR training manikins 41 A-D and at least one receiver unit 42. The figure shows four manikins, but the number of manikins may vary according to the number of students or other circumstances. Each manikin 41A-D comprises at least one sensor and a microcontroller connected to each sensor, and each microcontroller is connected to a Bluetooth transmitter adapted to transmit the data from the sensors within a BLE advertising package 44 to the at least one receiver unit 42, for example as described above.

The sensors measure for example compression depth with an accuracy of ±15% or 3 mm of actual depth, whichever is higher within the range of 0-55 mm. A compression sensor further may measure time and CPR compression data: compression depth, compression rate, leaning.

The microcontroller performs CPR quality calculations and send the variables to the receiver, using BLE advertisement packages 44 as described above. The BLE advertisement packages In order to save power, the sensors and microcontroller are turned off or turns into low-power/idle modus 30 seconds after the last detected compression.

There may be a need for calibrating each sensor. In particular, it may be advantageous that each sensor is calibrated for depth before first use. This can be done by performing 20 compressions and then waiting minimum 30 seconds (with the chest completely released) until the system shuts down.

The receiver unit 42 is adapted to receive the CPR data 44 from the transmitters in the manikins, analyze the received data 44 and display the result of the analysis in a grid 45, where each grid cell 43 of the grid represents the data from a respective transmitter, and thus a respective manikin 41A-D. In the figure, the data from manikin 41A is displayed in grid cell 43A, data from manikin 41B is displayed in grid cell 41B, etc.

The invention claimed is:

1. A cardio-pulmonary resuscitation (CPR) training system comprising:
   a plurality of CPR training manikins; and
   at least one receiver unit,
   wherein each CPR training manikin comprises at least one sensor and a microcontroller connected to the at least one sensor,
   wherein the microcontroller is connected to a Bluetooth transmitter adapted to transmit data from the at least one sensor within a Bluetooth Low Energy (BLE) advertising package to the at least one receiver unit, and
   wherein the Bluetooth transmitter is adapted to transmit advertising packages in a time period from a start of compressions until 30 seconds after a last registered compression in a compression series.

2. The CPR training system according to claim 1, wherein the at least one sensor is one or more of a movement sensor, a force sensor, an acceleration sensor, tilt sensor, compression depth sensor, a compression rate sensor, ventilation volume sensor and/or a chest rise sensor.

3. The CPR training system according to claim 1, wherein the microcontroller is adapted to use information from the at least one sensor to detect when a compression starts and to transfer measurement data to the Bluetooth transmitter by the start of compressions.

4. The CPR training system according to claim 1, further comprising a power source.

5. The CPR training system according to claim 1, wherein each CPR training manikin have an active state and a passive state.

6. The CPR training system according to claim 1, wherein the at least one sensor is connected to a separate microcontroller.

7. The CPR training system according to claim 1, wherein one microcontroller is connected to several sensors.

8. The CPR training system according to claim 1, wherein the at least one sensor is calibrated for depth before first use by performing 20 compressions and then waiting a minimum 30 seconds until the CPR training system shuts down.

9. A method for communication between a plurality of cardio-pulmonary resuscitation (CPR) training manikins and at least one receiver unit, wherein each CPR training manikin comprises at least one sensor and a microcontroller connected to the at least one sensor, and wherein the microcontroller is connected to a Bluetooth transmitter, the method comprising:
   measuring compression data with the at least one sensor;
   processing the measured compression data in the microcontroller;
   transmitting the measured compression data from the at least one sensor within a Bluetooth Low Energy (BLE) advertising package to the at least one receiver unit; and
   sending advertising package data in a time period from a start of a first compression until 30 seconds after a last registered compression in a series of compressions.

10. The method according to claim 9, wherein the measured compression data are movement, force, acceleration, tilt, compression depth, compression rate and/or ventilation volume and/or rate.

11. The method according to claim 9, further comprising detecting a start of a compression, and transferring the measured compression data to the Bluetooth transmitter by the start of compressions.

12. The method according to claim 9, wherein each CPR training manikin have an active state and a passive state,
wherein in the active state, the at least one sensor is active, the microcontroller is processing data for the at least one sensor, and the processed data are transmitted, and
wherein in the passive state only presence of compressions is detected and processed.

13. The method according to claim 12, wherein in a case of detection of a compression, the active state is activated.

14. The method according to claim 9, wherein the BLE advertising package comprises data characterizing at least one of: number of compressions, number of deep compressions, number of compressions with leaning, average compression rate since start of compressions, average depth of compressions since start of compressions, time period with no ventilation, and/or scoring parameters.

15. A cardio-pulmonary resuscitation (CPR) training manikin comprising:
at least one CPR evaluation sensor;
a microcontroller connected to each CPR evaluation sensor,
wherein the microcontroller is connected to a Bluetooth transmitter adapted to transmit data from the at least one CPR evaluation sensor within a Bluetooth Low Energy (BLE) advertising package to at least one receiver unit, and
wherein the Bluetooth transmitter is adapted to transmit advertising packages in a time period from a start of compressions until 30 seconds after a last registered compression in a compression series.

* * * * *